(12) United States Patent
Runde

(10) Patent No.: US 8,727,442 B2
(45) Date of Patent: May 20, 2014

(54) IN-LINE RECLINER RETURN MECHANISM

(75) Inventor: David M. Runde, Beverley Hills, MI (US)

(73) Assignee: Magna Seating Inc., Aurora, Ontario (CA)

( * ) Notice: Subject to any disclaimer, the term of this patent is extended or adjusted under 35 U.S.C. 154(b) by 33 days.

(21) Appl. No.: 13/523,166

(22) Filed: Jun. 14, 2012

(65) Prior Publication Data

US 2012/0319446 A1 Dec. 20, 2012

Related U.S. Application Data

(60) Provisional application No. 61/497,792, filed on Jun. 16, 2011.

(51) Int. Cl.
B60N 2/20 (2006.01)
B60N 2/22 (2006.01)
B60N 2/48 (2006.01)

(52) U.S. Cl.
USPC .................. 297/378.12; 297/378.14; 297/61

(58) Field of Classification Search
USPC .................. 297/63, 378.12, 403, 61, 378.14
See application file for complete search history.

(56) References Cited

U.S. PATENT DOCUMENTS

| | | | | |
|---|---|---|---|---|
| 4,268,086 A * | 5/1981 | Okuyama | ....................... | 297/63 |
| 5,020,853 A | 6/1991 | Babbs | | |
| 5,174,630 A | 12/1992 | Cilliere et al. | | |
| 6,106,067 A | 8/2000 | Zhuang et al. | | |
| 6,152,533 A * | 11/2000 | Smuk | ................... | 297/378.12 X |
| 6,315,361 B1 | 11/2001 | Stone et al. | | |
| 6,336,679 B1 | 1/2002 | Smuk | | |
| 6,454,355 B2 * | 9/2002 | Biletskiy | ................... | 297/378.12 |
| 6,910,739 B2 * | 6/2005 | Grable et al. | ............. | 297/378.12 |
| 7,025,419 B2 * | 4/2006 | Sasaki et al. | ......... | 297/378.12 X |
| 7,086,697 B2 * | 8/2006 | Tame | ................... | 297/378.12 X |
| 7,114,779 B2 * | 10/2006 | Thiel et al. | ............... | 297/378.12 |
| 7,201,425 B2 * | 4/2007 | Tsujibayashi et al. | ... | 297/378.14 X |
| 7,255,398 B2 * | 8/2007 | Tokui et al. | ........... | 297/378.12 X |
| 7,325,876 B2 * | 2/2008 | Lavoie et al. | ............. | 297/378.12 |
| 7,328,954 B2 * | 2/2008 | Sasaki et al. | ............. | 297/378.12 |
| 7,367,625 B2 | 5/2008 | Mori et al. | | |
| 7,578,556 B2 * | 8/2009 | Ohba et al. | ........... | 297/378.12 X |
| 7,686,398 B2 * | 3/2010 | Yokoyama | ........... | 297/378.12 X |
| 7,963,608 B2 * | 6/2011 | Wieclawski | ............. | 297/378.12 |
| 7,971,938 B2 * | 7/2011 | Wieclawski | ............. | 297/378.12 |
| 8,141,954 B2 * | 3/2012 | Kumazaki et al. | ... | 297/378.12 X |
| 8,439,444 B2 * | 5/2013 | Ngiau | ....................... | 297/378.12 |
| 2012/0062012 A1 * | 3/2012 | Miller et al. | ............. | 297/378.12 |
| 2012/0161479 A1 * | 6/2012 | Szybisty et al. | ................ | 297/61 |

* cited by examiner

*Primary Examiner* — Rodney B White
(74) *Attorney, Agent, or Firm* — Miller Canfield

(57) ABSTRACT

A vehicle seat assembly includes a seat back operatively coupled to a seat cushion for pivotal movement between an upright seating position, a folded position disposed forwardly of the upright seating position, and a spring engagement/disengagement position between the upright seating position and the folded position. A recliner return mechanism is operatively coupled to the seat back during pivotal movement of the seat back between the upright seating position and the spring engagement/disengagement position such that the recliner return mechanism biases the seat back forwardly toward the spring engagement/disengagement position. The recliner return mechanism is operatively decoupled from the seat back during pivotal movement of the seat back between the spring engagement/disengagement position and the folded position such that the seat back pivots freely between the spring engagement/disengagement position and the folded position.

18 Claims, 8 Drawing Sheets

IN-LINE RECLINER RETURN MECHANISM

CROSS-REFERENCE TO RELATED APPLICATION

This application claims the benefit of U.S. Provisional Application Ser. No. 61/497,792, filed Jun. 16, 2011 and entitled "In-Line Recliner Return Mechanism."

BACKGROUND OF THE INVENTION

1. Field of the Invention

The invention relates to a seat assembly for a motor vehicle. More particularly, the invention relates to a vehicle seat assembly having a recliner return mechanism located remotely from a recliner assembly for biasing a seat back toward a forwardly folded position.

2. Description of Related Art

Automotive vehicles typically include one or more seat assemblies having a seat cushion and a seat back for supporting a passenger above a vehicle floor. The seat assembly is commonly mounted to the vehicle floor by a seat track assembly to allow sliding fore and aft adjustment of the seat assembly for passenger comfort. It is also common that the seat back is operatively coupled to the seat cushion by a recliner assembly to allow pivotal adjustment of the seat back relative to the seat cushion. The seat back pivots relative to the seat cushion about a pivot axis that extends in a lateral direction.

The recliner assembly is operable between a locked condition that prevents pivotal movement of the seat back relative to the seat cushion and an unlocked condition that allows pivotal movement of the seat back relative to the seat cushion. In the unlocked condition, the seat back can be reclined or pivoted rearwardly between a plurality of reclined seating positions. Once a desired reclined seating position is selected the recliner assembly is returned to the locked condition to maintain the seat back in the desired reclined seating position. Alternatively, in the unlocked condition, the seat back can be dumped or pivoted forwardly to an easy-entry position and/or a fold flat position overlying the seat cushion. In the easy-entry position, the seat back is tilted forward to allow easier ingress and egress to a rear seat assembly or a rear cargo area. Similarly, in the fold flat position, the seat back is folded forward against the seat cushion to increase the available cargo space in the vehicle.

Typically, the seat assembly includes a clock spring that is disposed about the pivot axis and biases the seat back forwardly towards the easy-entry position and/or the fold flat position. More specifically, one end of the clock spring engages the seat cushion and another end of the clock spring engages the seat back such that the clock spring biases the seat back forwardly. When the seat assembly is occupied in one of the plurality of reclined seating positions and the recliner assembly is actuated to the unlocked condition, the clock spring biases the seat back forwardly to assist with adjustment of the seat back.

Further, when the seat assembly is unoccupied in one of the plurality of reclined seating positions and the recliner assembly is actuated to the unlocked condition, the clock spring biases the seat back to the easy-entry position and if the seat back is not blocked at the easy-entry position the clock spring will continue to bias the seat back to the fold flat position. In order to return the seat back from the fold flat position to one of the plurality of reclined seating positions an individual must overcome both the weight of the seat back and the bias of the clock spring. It is appreciated that the weight of the seat back is most noticeable when the seat back is generally horizontal as the seat back is first being pivoted from the fold flat position. It is also appreciated that the bias of the clock spring will steadily increase as the seat back is returned from the fold flat position toward the plurality of reclined seating positions. For some individuals it is difficult to overcome the combination of the weight of the seat back and the bias of the clock spring in order to return the seat back from the fold flat position to one of the plurality of reclined seating positions.

It is desirable, therefore, to provide a recliner return mechanism that biases a seat back forwardly from a plurality of reclined seating positions to a folded position, wherein a biasing force of the recliner return mechanism does not act on the seat back as the seat back is returned from the folded position towards the plurality of reclined seating positions until the seat back reaches a spring engagement position.

SUMMARY OF THE INVENTION

According to one aspect of the invention, a vehicle seat assembly includes a seat back operatively coupled to a seat cushion by a recliner assembly. The recliner assembly is operable between a locked condition to prevent pivotal movement of the seat back relative to the seat cushion and an unlocked position to allow pivotal movement of the seat back relative to the seat cushion. The seat back is pivotal between an upright seating position, a folded position disposed forwardly of the upright seating position, and a spring engagement/disengagement position between the upright seating position and the folded position. The seat assembly includes a recliner return mechanism that is operatively coupled between the seat back and the seat cushion to bias the seat back forwardly. The recliner return mechanism is operatively coupled to the seat back during pivotal movement of the seat back between the upright seating position and the spring engagement/disengagement position such that the recliner return mechanism biases the seat back forwardly toward the spring engagement/disengagement position. In contrast, the recliner return mechanism is operatively decoupled from the seat back during pivotal movement of the seat back between the spring engagement/disengagement position and the folded position such that the seat back pivots freely between the spring engagement/disengagement position and the folded position.

The recliner return mechanism generally includes an extension spring coupled to the seat cushion and a cable coupled between the extension spring and the seat back. In one embodiment of the invention, the cable is coupled to a lost motion slot on the seat back to prevent slack in the cable as the seat back pivots between the spring engagement/disengagement position and the folded position. In another embodiment of the invention, a tensioner engages the cable to prevent slack in the cable as the seat back pivots between the spring engagement/disengagement position and the folded position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
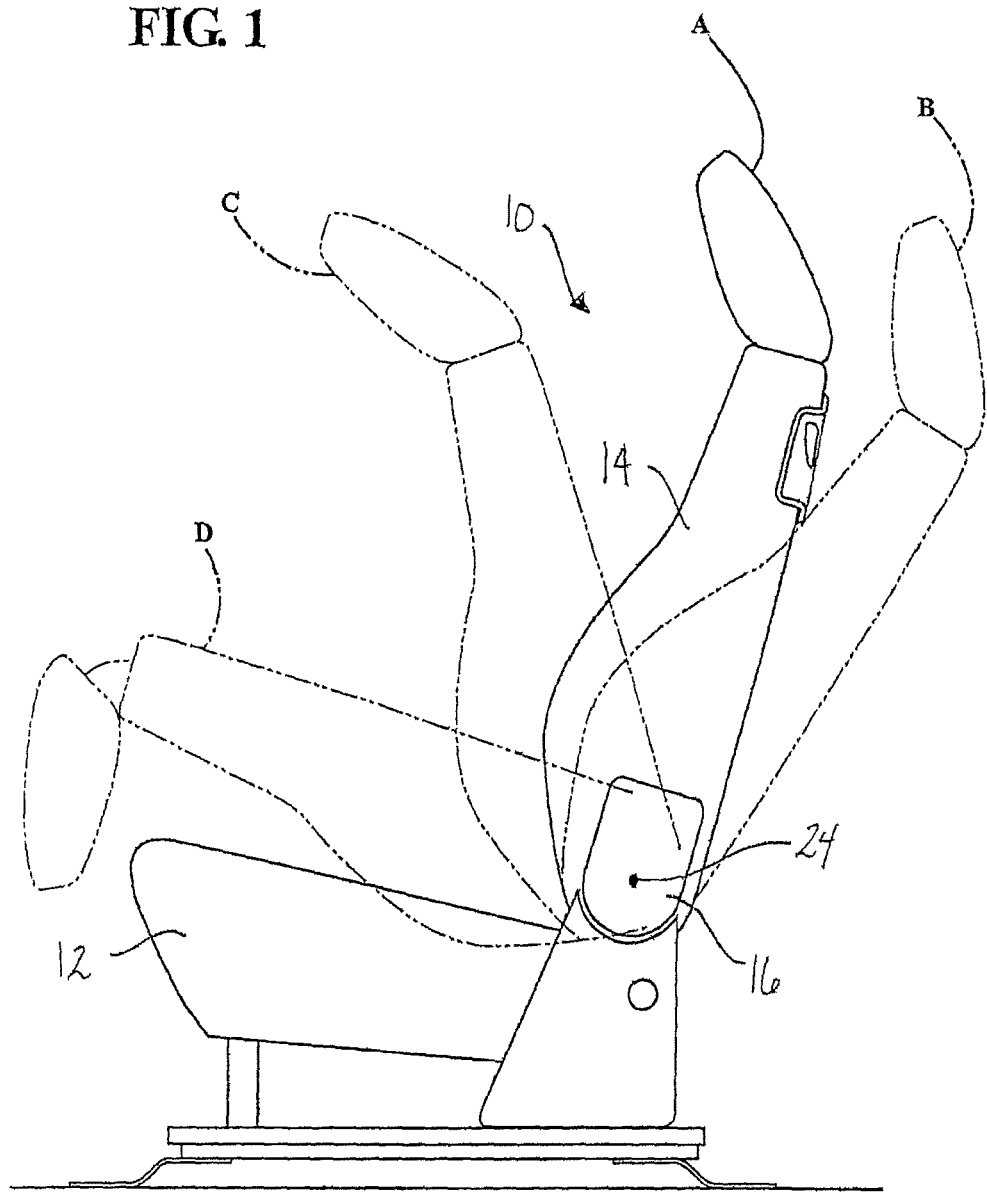
FIG. 1 is a side view of a vehicle seat assembly including a seat back operatively coupled to a seat cushion by a recliner assembly.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively coupled by a recliner assembly 16 to the seat cushion 12. As is well known in the art, the seat cushion 12 and seat back 14 each include corresponding frames 18, 20 covered by foam pads and a suitable trim cover material such as cloth, vinyl and/or leather. The recliner assembly 16 includes a pair of spaced apart and synchronized disc recliners 22, as is well known in the art. The disc recliners 22 allow for pivotal or angular adjustment of the seat back 14 relative to the seat cushion 12 about a pivot axis 24 that extends in a lateral direction. The seat back 14 is adjustable between an upright seating position A, a plurality of reclined seating positions disposed rearwardly of the upright seating position A, one of which is shown at B, an easy-entry position C disposed forwardly of the upright seating position A, and a fold flat position D overlying the seat cushion 12.

The disc recliners 22 are operable between a locked condition that prevents pivotal movement of the seat back 14 relative to the seat cushion 12 and an unlocked condition that allows pivotal movement of the seat back 14 relative to the seat cushion 12. In the unlocked condition, the seat back 14 can be adjusted between the upright seating position A and the plurality of reclined seating positions B. Once one of the reclined seating positions B is selected the disc recliners 22 are returned to the locked condition to maintain the seat back 14 in the selected reclined seating position B. Alternatively, in the unlocked condition, the seat back 14 can be dumped or pivoted forwardly to the easy-entry position C or the fold flat position D overlying the seat cushion 12.

The seat assembly 10 also includes an in-line recliner return mechanism, generally shown at 26, that is operatively coupled between the seat cushion 12 and the seat back 14 to bias the seat back 14 forwardly about the pivot axis 24. More specifically, when the seat assembly 10 is unoccupied and the seat back 14 is in the upright seating position A or one of the reclined seating positions B, actuating the disc recliners 22 to the unlocked condition will allow the recliner return mechanism 26 to pivot the seat back 14 forwardly about the pivot axis 24. Normally, a blocking mechanism (not shown) will stop the seat back 14 at the easy-entry position C. If the seat back 14 is not blocked at the easy-entry position C, however, the inertia of the seat back 14 and gravity will urge the seat back 14 to continue pivoting forwardly to the fold flat position D.

Figure 2A:
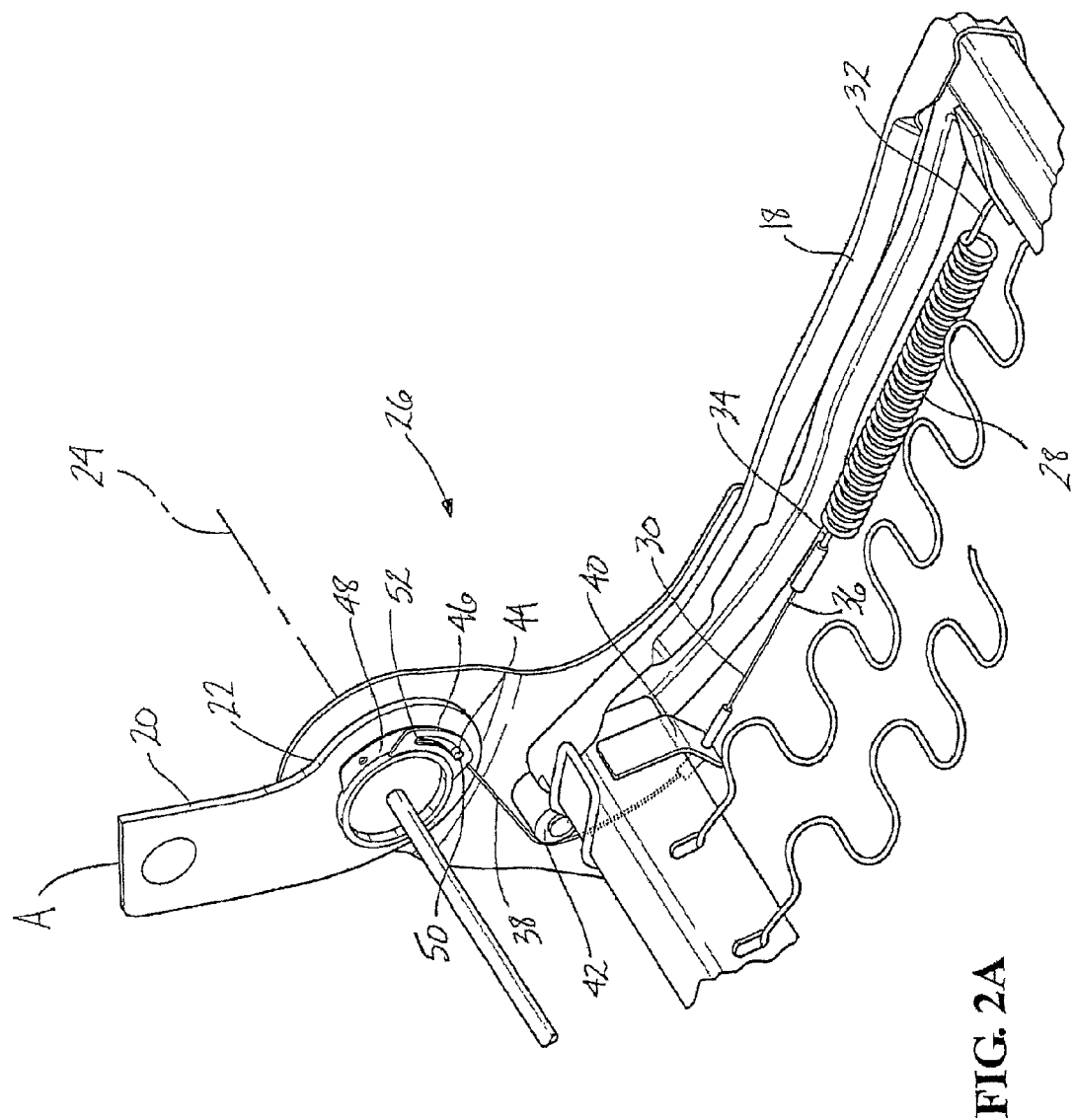
FIG. 2A is a fragmentary, inner perspective view of the seat assembly illustrating the seat back in an upright seating position and including an in-line recliner return mechanism according to a first embodiment of the invention.
Figure 2B:
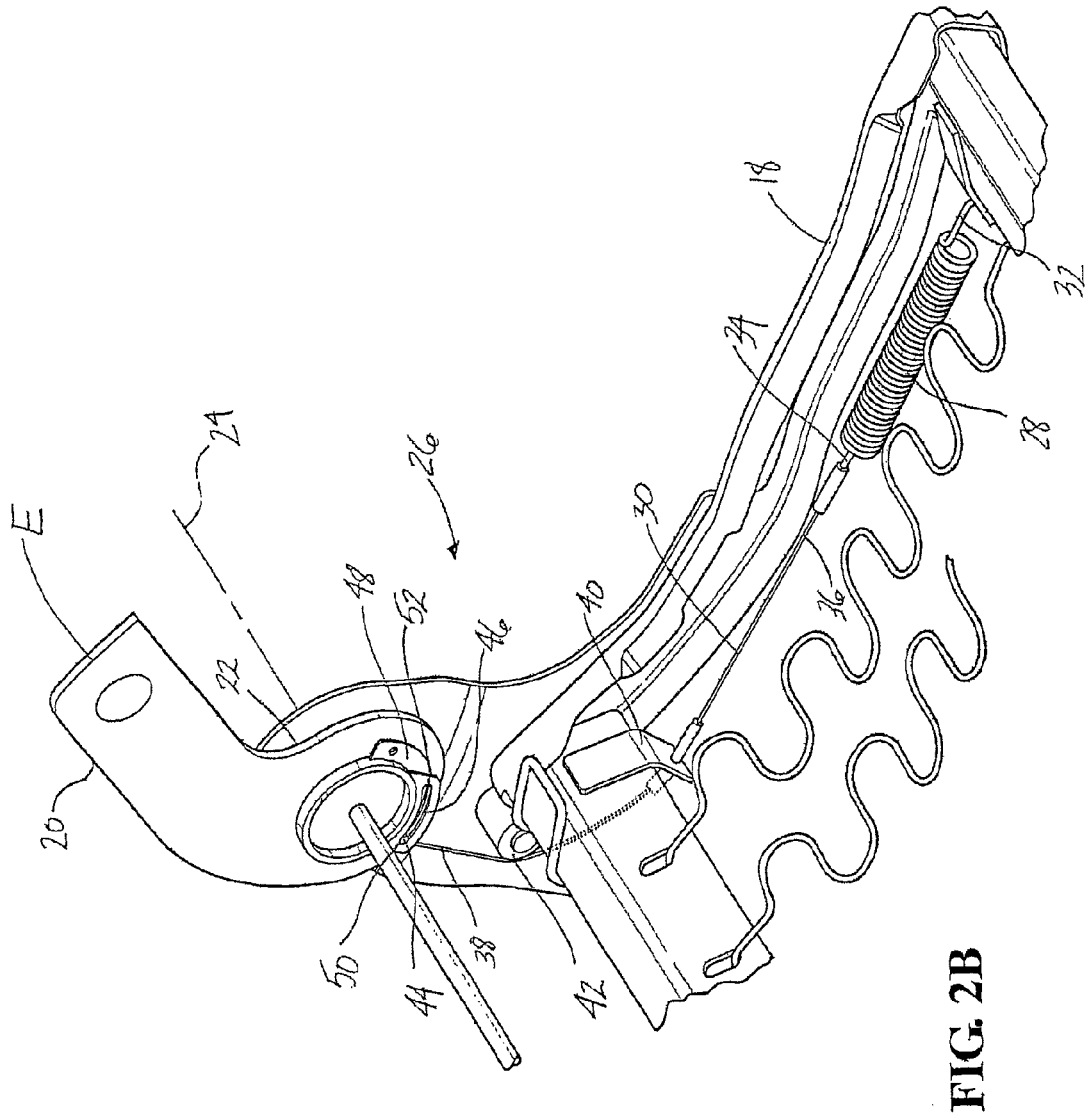
FIG. 2B is a fragmentary, inner perspective view of the seat assembly illustrating the seat back in a spring engagement/disengagement position and including the in-line recliner return mechanism according to the first embodiment of the invention.

As the seat back 14 pivots forwardly from the upright seating position A or one of the reclined seating positions B, the recliner return mechanism 26 ceases applying a biasing force to the seat back 14 once the seat back 14 reaches a spring engagement/disengagement position E, which is shown in FIG. 2B. In other words, at the spring engagement/disengagement position E, the recliner return mechanism 26 is operatively decoupled from the seat back 14 such that only inertia and gravity act on the seat back 14 to pivot the seat back 14 to the easy-entry position C or the fold flat position D. It is appreciated that the spring engagement/disengagement position E may or may not coincide with the easy-entry position C without varying from the scope of the invention.

Figure 2C:
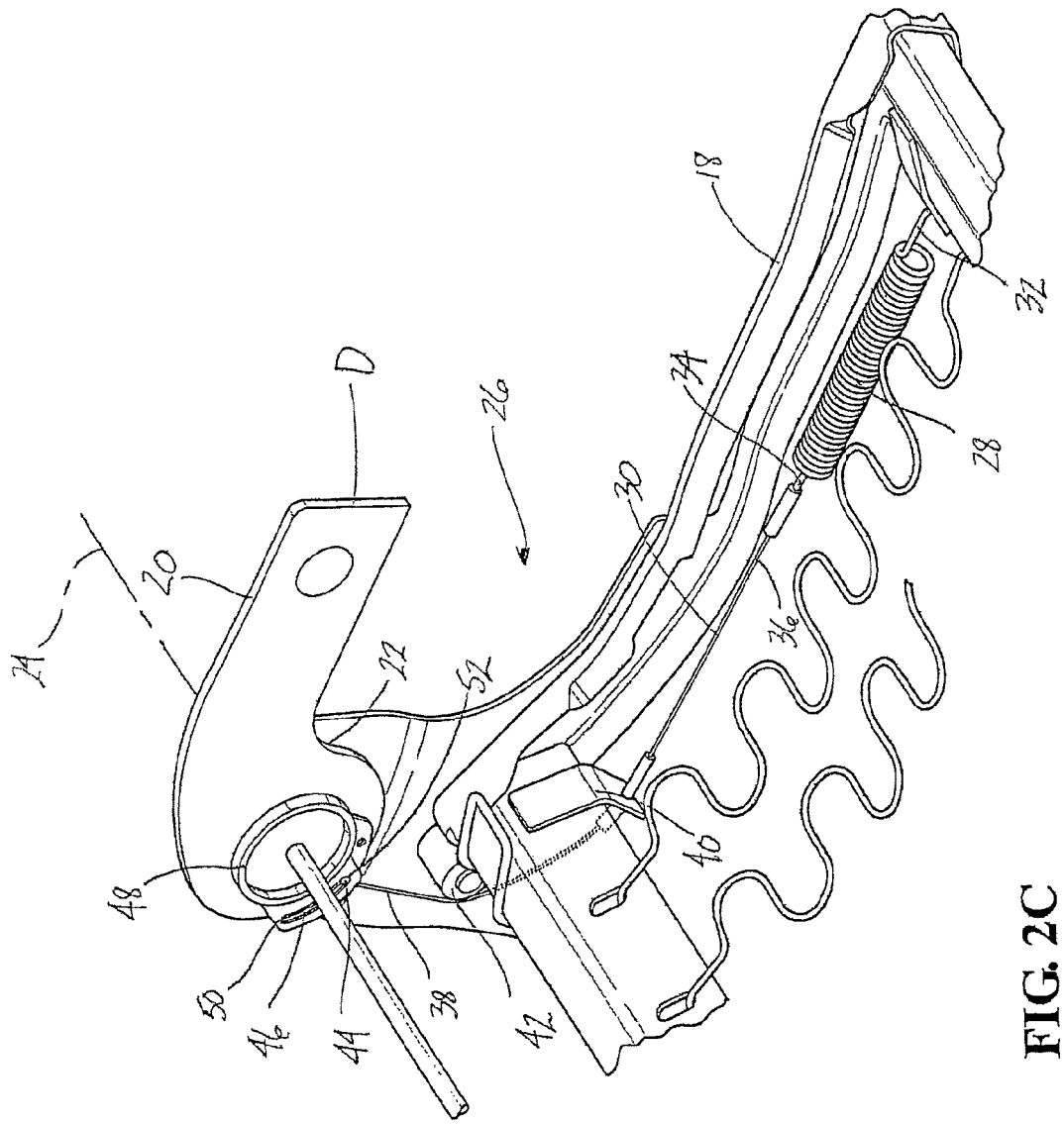
FIG. 2C is a fragmentary, inner perspective view of the seat assembly illustrating the seat back in a fold flat position and including the in-line recliner return mechanism according to the first embodiment of the invention.

Referring to FIGS. 2A through 2C, in a first embodiment of the invention, the recliner return mechanism 26 includes a helical extension spring 28 and a cable 30 operatively coupled between the spring 28 and the seat back 14. The spring 28 extends between a first end 32 that is fixedly secured to the seat cushion frame 18 and an opposite second end 34. The cable 30 extends between a first end 36 and a second end 38 and is guided along the seat cushion frame 18 by a cable attachment bracket 40 and one or more cable routing guides 42. The first end 36 of the cable 30 is fixedly coupled to the second end 34 of the spring 28 and the second end 38 of the cable 30 includes an actuation pin 44 secured thereto. The actuation pin 44 is slidably coupled to a lost motion slot 46 which is formed in an actuation ring 48 that is fixedly secured to the seat back frame 20. The lost motion slot 46 is adjacent to one of the disc recliners 22 and extends in a circumferential direction about the pivot axis 24 between a first end 50 and a second end 52.

In operation, beginning with the seat back 14 in the upright seating position A, shown in FIG. 2A, the actuation pin 44 is disposed at the first end 50 of the lost motion slot 46. The cable 30 has a length such that with the seat back 14 in the upright seating position A, the spring 28 is at least partially extended. As such, a biasing force from the spring 28 acts on the seat back 14 through the cable 30 to urge the seat back 14 to pivot forwardly. In response to actuating the disc recliners 22 to the unlocked condition, the biasing force causes the seat back 14 to pivot forwardly about the pivot axis 24. As the seat back 14 pivots forwardly, the biasing force of the spring 28 ceases once the seat back 14 reaches the spring engagement/disengagement position E, shown in FIG. 2B. At the spring engagement/disengagement position E, the actuation pin 44 is disposed at the first end 50 of the lost motion slot 46, the spring 28 is in a relaxed state, and there is no tension in the cable 30. As such, there is no biasing force from the spring 28 acting on the seat back 14 through the cable 30. The pivotal movement of the seat back 14 continues until the seat back 14 reaches the easy-entry position C or the fold flat position D, shown in FIG. 2C. As the seat back 14 pivots from the spring engagement/disengagement position E to the fold flat position D, the actuation pin 44 travels along the lost motion slot 46 from the first end 50 to the second end 52 thereof. At the fold flat position D, the actuation pin 44 is disposed at the second end 52 of the lost motion slot 46, the spring 28 is in the relaxed state, and there is no tension in the cable 30. As such, there is no biasing force from the spring 28 acting on the seat back 14 through the cable 30 during this range of pivotal movement of the seat back 14.

To return the seat back 14 to the upright seating position A, the seat back 14 is pivoted upwardly from the fold flat position D to the spring engagement/disengagement position E. At the same time, the actuation pin 44 travels along the lost motion slot 46 from the second end 52 to the first end 50 thereof. As noted above, at the spring engagement/disengagement position E, the actuation pin 44 is disposed at the first end 50 of the lost motion slot 46, the spring 28 is in the relaxed state, and there is no tension in the cable 30. As such, there is no biasing force from the spring 28 acting on the seat back 14 through the cable 30 during this range of pivotal movement of the seat back 14. In other words, as the seat back 14 is pivoted from the fold flat position D toward the spring engagement/disengagement position E, only the weight of the seat back 14 must be overcome.

Continued pivotal movement of the seat back 14 towards the upright seating position A causes the first end 50 of the lost motion slot 46 to pull the cable 30, thereby tensioning the cable 30 and stretching or extending the spring 28 such that the biasing force from the spring 28 acts on the seat back 14 through the cable 30. The biasing force acts in a direction opposite to the pivotal movement of the seat back 14 as the seat back 14 is pivoted towards the upright seating position A. The biasing force of the spring 28 increases linearly as the seat back 14 is pivoted from the spring engagement/disengagement position E to the upright seating position A. The biasing force of the spring 28 continues to increase as the seat back 14 is pivoted to one of the reclined seating positions B. It is appreciated that the biasing force of the spring 28 acting on the seat back 14 through the cable 30 is sufficient to pivot the seat back 14 forwardly from any one of the reclined seating positions B to the spring engagement/disengagement position E. It is further appreciated that the seat back 14 will pivot forwardly from the spring engagement/disengagement position E to the easy-entry position C or the fold flat position D in response to inertia and gravity.

Figure 3:
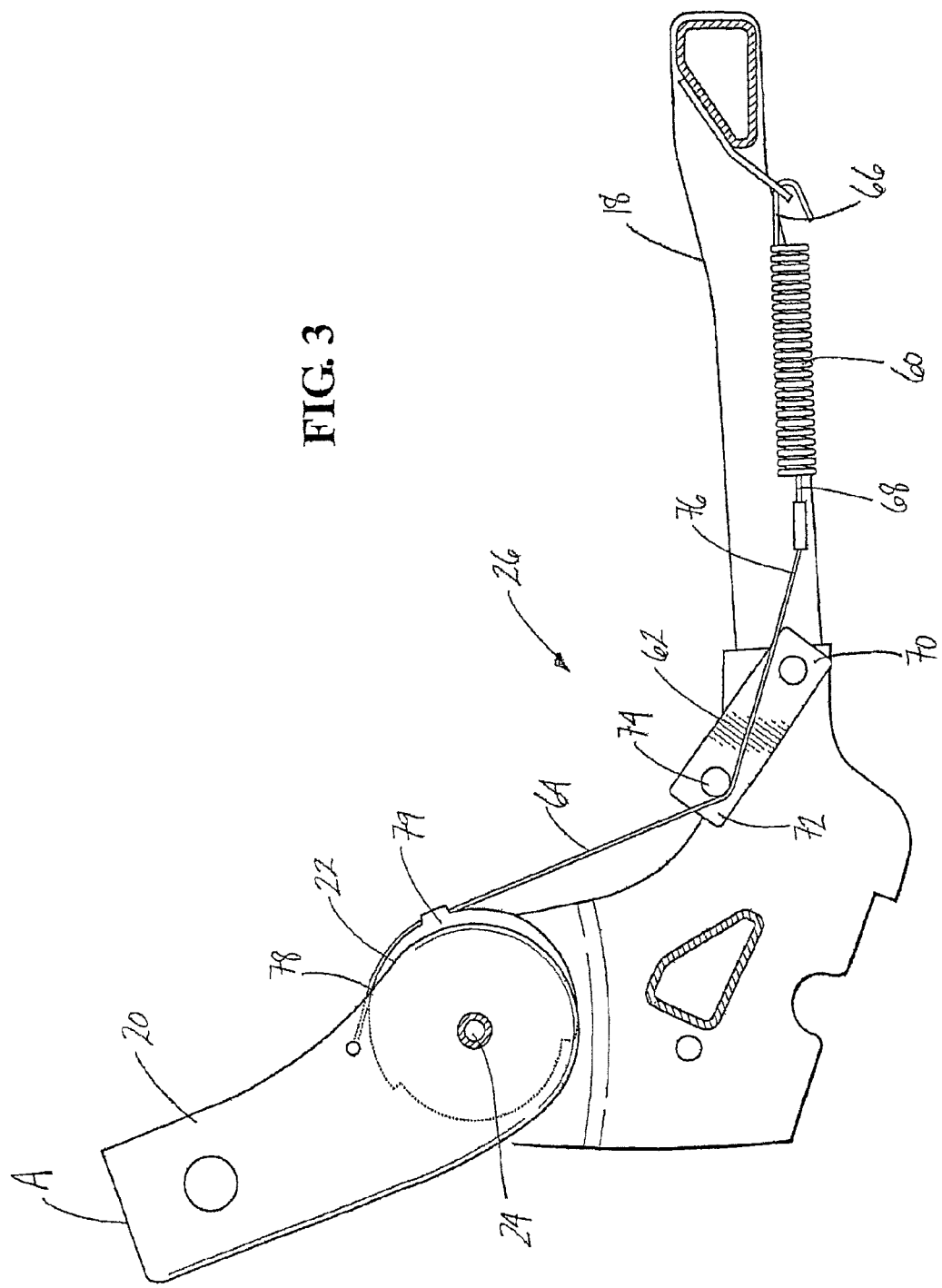
FIG. 3 is a fragmentary, partial cross-section, side view of the seat assembly illustrating the seat back in the upright seating position and including an in-line recliner return mechanism according to a second embodiment of the invention.
Figure 4:
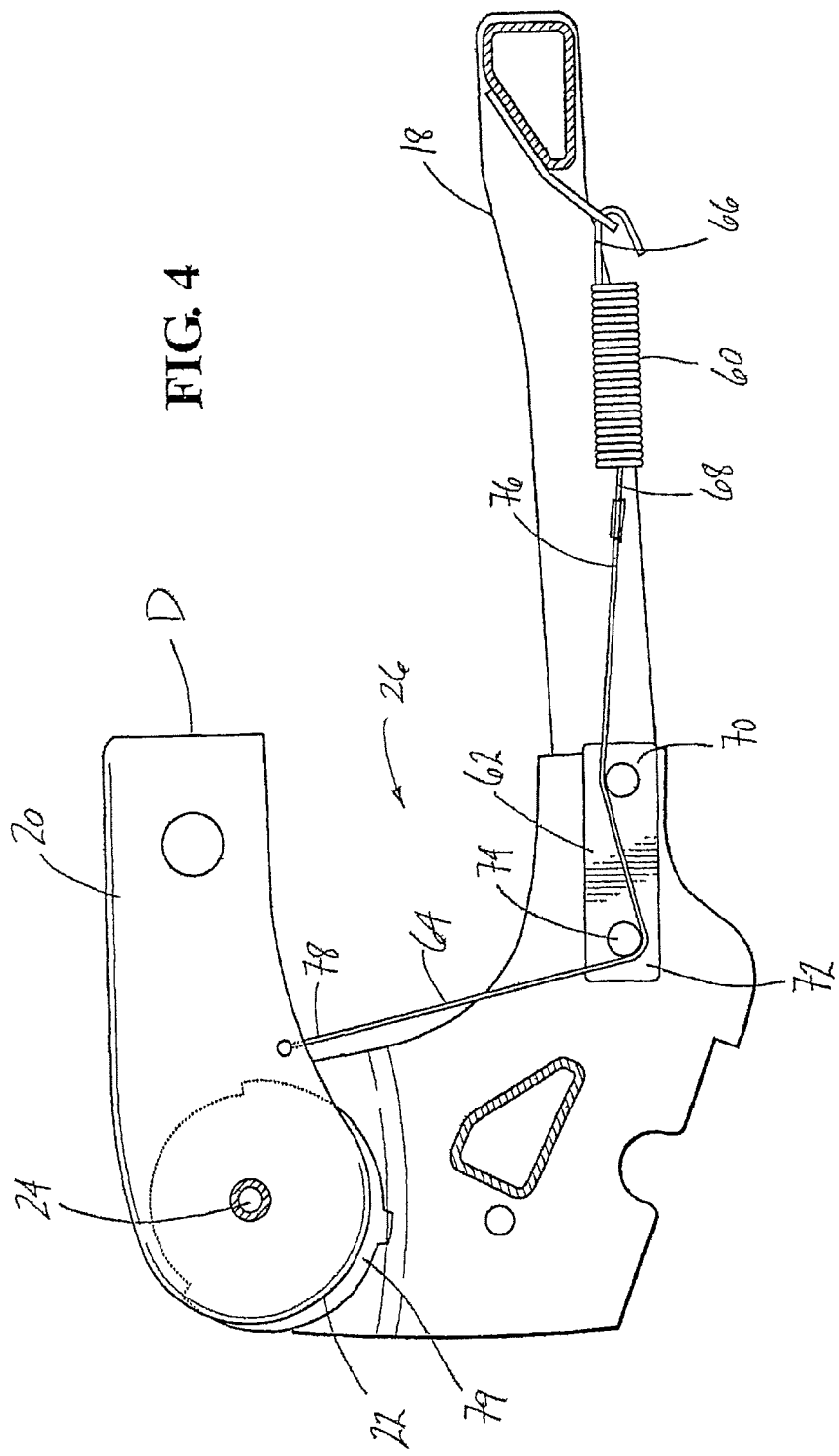
FIG. 4 is a fragmentary, partial cross-section, side view of the seat assembly illustrating the seat back in the fold flat position and including the in-line recliner return mechanism according to the second embodiment of the invention.

Referring to FIGS. 3 and 4, in a second embodiment of the invention, the recliner return mechanism 26 includes a helical extension spring 60, a tensioner arm 62, and a cable 64 operatively coupled between the spring 60 and the seat back 14. The spring 60 extends between a first end 66 that is fixedly secured to the seat cushion frame 18 and an opposite second end 68. The tensioner arm 62 extends between a proximal end 70 that is pivotally coupled to the seat cushion frame 18 and a distal end 72 having a guide 74. The tensioner arm 62 pivots between a first pivotal position, shown in FIG. 4, and a second pivotal position, shown in FIG. 3. The tensioner arm 62 is biased in a first direction (counterclockwise when viewed from the Figures) toward the first pivotal position to remove slack from the cable 64 as described in detail below. The cable 64 extends between a first end 76 fixedly coupled to the second end 68 of the spring 60 and a second end 78 fixedly coupled to the seat back frame 20 adjacent to one of the disc recliners 22. Between the first end 76 and the second end 78, the cable 64 is routed partially around the guide 74 on the tensioner arm 62 in a second direction (clockwise when viewed from the Figures). A recliner cable guide 79 is mounted to the seat back frame 20 adjacent one of the disc recliners 22. The recliner cable guide 79 is typically a plastic part for guiding the cable 64 around the disc recliner 22 to prevent cable damage due to friction against the disc recliner 22. The recliner cable guide 79 has a profile which the cable 64 follows in the circumferential direction about the pivot axis 24 when the seat back 14 is in the upright seating position A or one of the plurality of reclined seating positions B. The profile offsets the cable 64 from the pivot axis 24 generally in the direction which the seat back 14 pivots towards the spring engagement/disengagement position E.

In operation, beginning with the seat back 14 in the upright seating position A, shown in FIG. 3, the cable 64 has a length such that with the tensioner arm 62 disposed in the second pivotal position the spring 60 is at least partially extended. As such, a biasing force from the spring 60 acts on the seat back 14 through the cable 64 to urge the seat back 14 to pivot forwardly. In response to actuating the disc recliners 22 to the unlocked condition, the biasing force causes the seat back 14 to pivot forwardly about the pivot axis 24. As the seat back 14 pivots forwardly, the biasing force of the spring 60 ceases once the seat back 14 reaches the spring engagement/disengagement position E. At the spring engagement/disengagement position E, the tensioner arm 62 is still in the second pivotal position, the spring 60 is in a relaxed state, and there is no tension in the cable 64. As such, there is no biasing force from the spring 60 acting on the seat back 14 through the cable 64. The pivotal movement of the seat back 14 continues until the seat back 14 reaches the easy-entry position C or the fold flat position D, shown in FIG. 4. As the seat back 14 pivots from the spring engagement/disengagement position E to the fold flat position D, the tensioner arm 62 pivots in the counterclockwise direction from the second pivotal position to the first pivotal position to remove slack from the cable 64. At the fold flat position D, the tensioner arm 62 is disposed in the first pivotal position, the spring 60 is in the relaxed state, and there is no tension in the cable 64. As such, there is no biasing force from the spring 60 acting on the seat back 14 through the cable 64 during this range of pivotal movement of the seat back 14.

To return the seat back 14 to the upright seating position A, the seat back 14 is pivoted upwardly from the fold flat position D to the spring engagement/disengagement position E. At the same time, the seat back 14 pulls the cable 64 which causes the tensioner arm 62 to pivot in the clockwise direction from the first pivotal position to the second pivotal position. As noted above, at the spring engagement/disengagement position E, the tensioner arm 62 is disposed in the second pivotal position, the spring 60 is in the relaxed state, and there is no tension in the cable 64. As such, there is no biasing force from the spring 60 acting on the seat back 14 through the cable 64 during this range of pivotal movement of the seat back 14. In other words, as the seat back 14 is pivoted from the fold flat position D toward the spring engagement/disengagement position E, only the weight of the seat back 14 must be overcome.

The tensioner arm 62 cannot pivot in the clockwise direction beyond the second pivotal position. As such, continued pivotal movement of the seat back 14 towards the upright seating position A causes the seat back 14 to pull the cable 64, thereby stretching or extending the spring 60 such that the biasing force from the spring 60 acts on the seat back 14 through the cable 64. The biasing force acts in a direction opposite to the pivotal movement of the seat back 14 as the seat back 14 pivots toward the upright seating position A. The biasing force of the spring 60 increases linearly as the seat back 14 pivots from the spring engagement/disengagement position E to the upright seating position A. The biasing force of the spring 60 continues to increase as the seat back 14 pivots to one of the reclined seating positions B. It is appreciated that the biasing force of the spring 60 acting on the seat back 14 through the cable 64 is sufficient to pivot the seat back 14 forwardly from any one of the reclined seating positions B to the spring engagement/disengagement position E. It is also appreciated that the biasing force acting on the seat back 14 through the cable 64 pulls the cable 64 against the profile of the recliner cable guide 79, and since the profile offsets the cable 64 from the pivot axis 24 this creates a larger moment about the pivot axis 24 to assist with pivoting the seat back 14 forwardly to the spring engagement/disengagement position E. It is further appreciated that the seat back 14 will pivot forwardly from the spring engagement/disengagement position E to the easy-entry position C or the fold flat position D in response to inertia and gravity.

Figure 5:
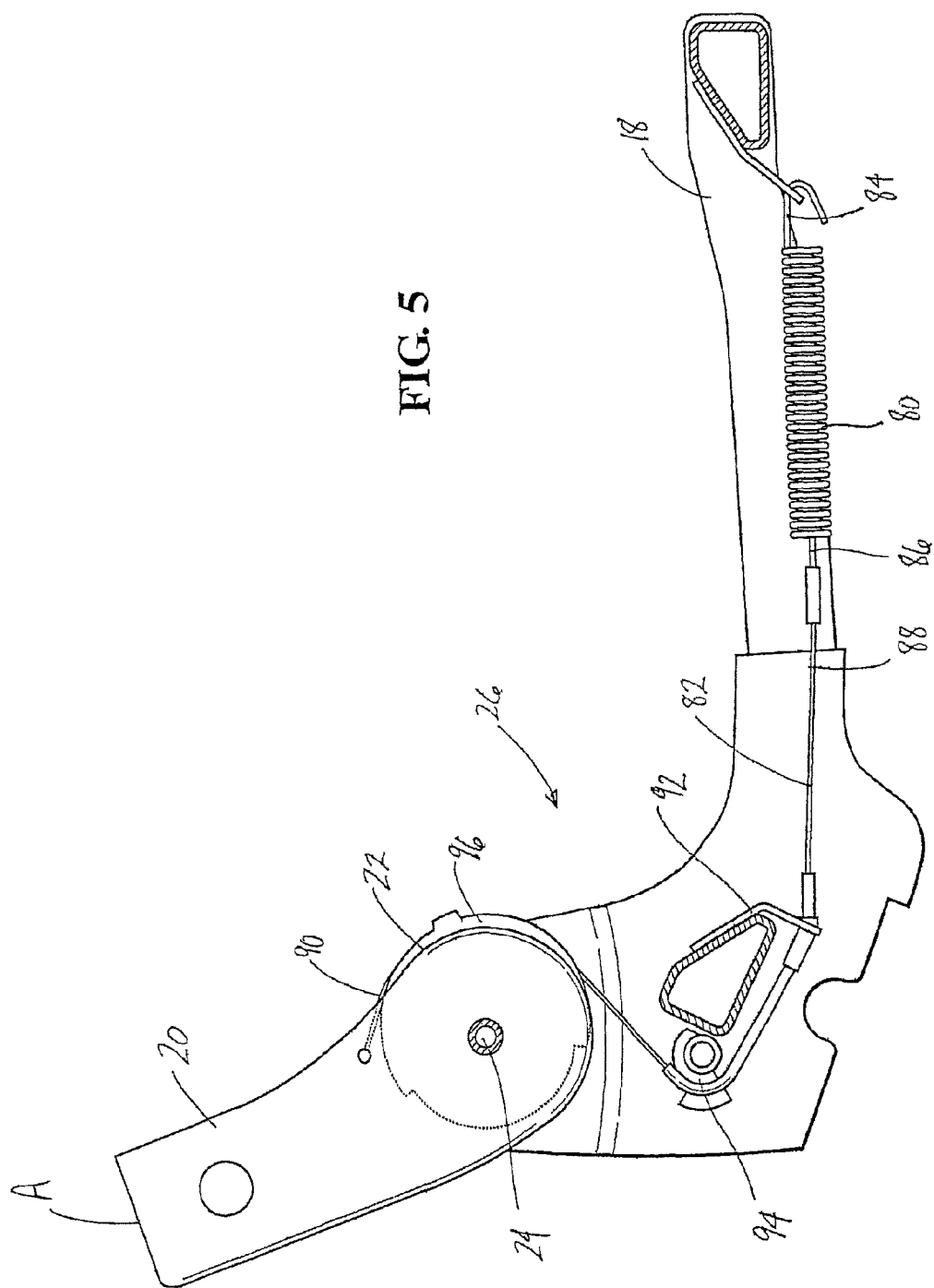
FIG. 5 is a fragmentary, partial cross-section, side view of the seat assembly illustrating the seat back in the upright seating position and including an in-line recliner return mechanism according to a third embodiment of the invention.
Figure 6:
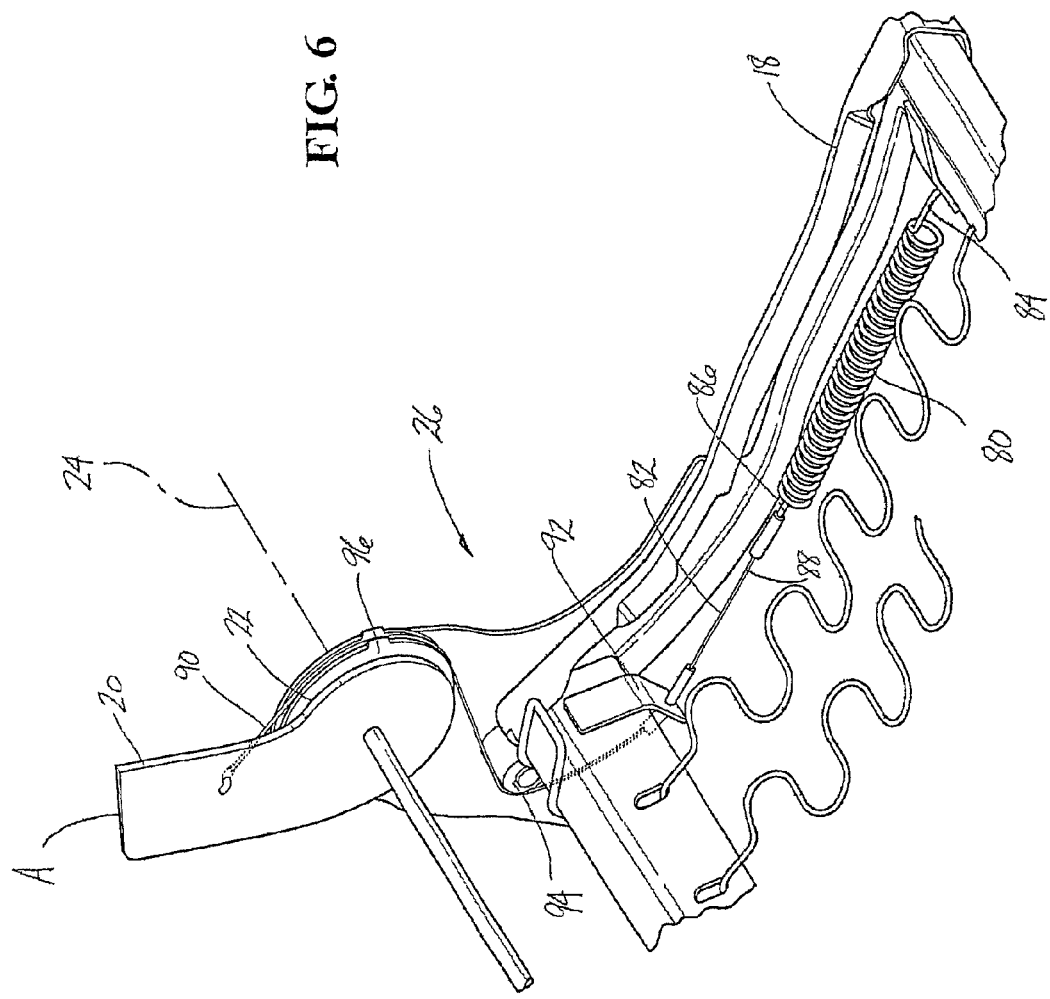
FIG. 6 is a fragmentary, inner perspective view of the seat assembly illustrating the seat back in the upright seating position and including the in-line recliner return mechanism according to the third embodiment of the invention.

Referring to FIGS. 5 and 6, in a third embodiment of the invention, the recliner return mechanism 26 includes a helical extension spring 80, a cable tensioner (not shown), and a cable 82 operatively coupled between the spring 80 and the seat back 14. The spring 80 extends between a first end 84 that is fixedly secured to the seat cushion frame 18 and an opposite second end 86. The cable 82 extends between a first end 88 and a second end 90 and is guided along the seat cushion frame 18 by a cable attachment bracket 92 and one or more cable routing guides 94. The first end 88 of the cable 82 is fixedly coupled to the second end 86 of the spring 80 and the second end 90 of the cable 82 is fixedly coupled to the seat back frame 20 adjacent to one of the disc recliners 22. The cable tensioner is mounted to the seat cushion frame 18 and is movable between a first position and a second position. The cable tensioner is operatively coupled to the cable 82, generally between the first end 88 and the second end 90, and is biased toward the first position to remove slack from the cable 82 as described below in detail. A recliner cable guide 96 is mounted to the seat back frame 20 adjacent one of the disc recliners 22. The recliner cable guide 96 is typically a plastic part for guiding the cable 82 around the disc recliner 22 to prevent cable damage due to friction against the disc recliner 22. The recliner cable guide 96 has a profile which the cable 82 follows in the circumferential direction about the pivot axis 24 when the seat back 14 is in the upright seating position A or one of the plurality of reclined seating positions B. The profile offsets the cable 82 from the pivot axis 24 generally in the direction which the seat back 14 pivots towards the spring engagement/disengagement position E.

In operation, beginning with the seat back 14 in the upright position seating position A, the cable 82 has a length such that with the cable tensioner disposed in the second position the spring 80 is at least partially extended. As such, a biasing force from the spring 80 acts on the seat back 14 through the cable 82 to urge the seat back 14 to pivot forwardly. In response to actuating the disc recliners 22 to the unlocked condition, the biasing force causes the seat back 14 to pivot forwardly about the pivot axis 24. As the seat back 14 pivots forwardly, the biasing force of the spring 80 ceases once the seat back 14 reaches the spring engagement/disengagement position E. At the spring engagement/disengagement position E, the cable tensioner is still in the second position, the spring 80 is in a relaxed state, and there is no tension in the cable 82. As such, there is no biasing force from the spring 80 acting on the seat back 14 through the cable 82. The pivotal movement of the seat back 14 continues until the seat back 14 reaches the easy-entry position C or the fold flat position D. As the seat back 14 pivots from the spring engagement/disengagement position E to the fold flat position D, the cable tensioner moves from the second position to the first position to operably remove slack from the cable 82. At the fold flat position D, the cable tensioner is disposed in the first position, the spring 80 is in the relaxed state, and there is no tension in the cable 82. As such, there is no biasing force from the spring 80 acting on the seat back 14 through the cable 82 during this range of pivotal movement of the seat back 14.

To return the seat back 14 to the upright seating position A, the seat back 14 is pivoted upwardly from the fold flat position D to the spring engagement/disengagement position E. At the same time, the seat back 14 pulls the cable 82 which causes the cable tensioner to move from the first position to the second position. As noted above, at the spring engagement/disengagement position E, the cable tensioner is disposed in the second position, the spring 80 is in the relaxed state, and there is no tension in the cable 82. As such, there is no biasing force from the spring 80 acting on the seat back 14 through the cable 82 during this range of pivotal movement of the seat back 14. In other words, as the seat back 14 is pivoted from the fold flat position D toward the spring engagement/disengagement position E, only the weight of the seat back 14 must be overcome.

The cable tensioner cannot move beyond the second position. As such, continued pivotal movement of the seat back 14 towards the upright seating position A causes the seat back 14 to pull the cable 82, thereby stretching or extending the spring 80 such that the biasing force from the spring 80 acts on the seat back 14 through the cable 82. The biasing force acts in a direction opposite to the pivotal movement of the seat back 14 as the seat back 14 pivots toward the upright seating position A. The biasing force of the spring 80 increases linearly as the seat back 14 pivots from the spring engagement/disengagement position E to the upright seating position A. The biasing force of the spring 80 continues to increase as the seat back 14 pivots to one of the reclined seating positions B. It is appreciated that the biasing force of the spring 80 acting on the seat back 14 through the cable 82 is sufficient to pivot the seat back 14 forwardly from any one of the reclined seating positions B to the spring engagement/disengagement position E. It is also appreciated that the biasing force acting on the seat back 14 through the cable 82 pulls the cable 82 against the profile of the recliner cable guide 96, and since the profile offsets the cable 82 from the pivot axis 24 this creates a larger moment about the pivot axis 24 to assist with pivoting the seat back 14 forwardly to the spring engagement/disengagement position E. It is further appreciated that the seat back 14 will pivot forwardly from the spring engagement/disengagement position E to the easy-entry position C or the fold flat position D in response to inertia and gravity.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A vehicle seat assembly comprising:
 a seat cushion;
 a seat back operatively coupled to said seat cushion for pivotal movement about a pivot axis between an upright seating position, a folded position disposed forwardly of said upright seating position, and a spring engagement/disengagement position between said upright seating position and said folded position; and
 a recliner return mechanism, wherein said recliner return mechanism is operatively coupled to said seat back during pivotal movement of said seat back between said upright seating position and said spring engagement/ disengagement position such that said recliner return mechanism biases said seat back forwardly toward said spring engagement/disengagement position, and wherein said recliner return mechanism is operatively decoupled from said seat back during pivotal movement of said seat back between said spring engagement/disengagement position and said folded position such that said seat back pivots freely between said spring engagement/disengagement position and said folded position; wherein a biasing force of said recliner return mechanism acts on said seat back between said upright seating position and said spring engagement/disengagement position, and wherein said biasing force increases linearly as said seat back pivots from said spring engagement/disengagement position to said upright seating position; and said recliner return mechanism includes an extension spring and a cable, wherein said extension spring extends between a first end fixedly secured to said seat cushion and a second end, and wherein said cable extends between a first end fixedly coupled to said second end of said extension spring and a second end coupled to said seat back.

2. The vehicle seat assembly as set forth in claim 1 wherein said extension spring is at least partially extended when said seat back is in said upright seating position.

3. The vehicle seat assembly as set forth in claim 2 wherein said extension spring is in a relaxed state when said seat back is in said spring engagement/disengagement position and when said seat back is in said folded position.

4. The vehicle seat assembly as set forth in claim 3 including a recliner assembly operatively coupling said seat back and said seat cushion, wherein said recliner assembly is operable between a locked condition preventing pivotal movement of said seat back relative to said seat cushion and an unlocked condition allowing pivotal movement of said seat back relative to said seat cushion.

5. The vehicle seat assembly as set forth in claim 4 wherein said seat back includes a slot extending between a first end and a second end, said second end of said cable is slidably coupled to said slot.

6. The vehicle seat assembly as set forth in claim 5 wherein said second end of said cable is disposed at said first end of said slot when said seat back is in said upright seating position, and wherein said second end of said cable is disposed at said first end of said slot when said seat back is in said spring engagement/disengagement position, and wherein said second end of said cable is disposed at said second end of said slot when said seat back is in said folded position.

7. The vehicle seat assembly as set forth in claim 6 wherein said second end of said cable travels along said slot from said first end to said second end in response to pivotal movement of said seat back from said spring engagement/disengagement position to said folded position, and wherein said second end of said cable travels along said slot from said second end to said first end in response to pivotal movement of said seat back from said folded position to said spring engagement/disengagement position.

8. The vehicle seat assembly as set forth in claim 7 wherein said slot extends in a circumferential direction about said pivot axis.

9. The vehicle seat assembly as set forth in claim 8 including at least one cable routing guide coupled to said seat cushion and engaging said cable between said first and second ends to guide said cable.

10. The vehicle seat assembly as set forth in claim 9 including a recliner cable guide mounted to said seat back and engaging said cable between said first and second ends to guide said cable in said circumferential direction around said pivot axis, wherein said recliner cable guide offsets said cable from said pivot axis generally in a direction which said seat back pivots towards said spring engagement/disengagement position thereby creating a moment about said pivot axis to assist with pivotal movement of said seat back from said upright seating position to said spring engagement/disengagement position in response to said biasing force of said recliner return mechanism.

11. The vehicle seat assembly as set forth in claim 4 including a tensioner arm pivotally coupled to said seat cushion and pivotable between a first pivotal position and a second pivotal position, said tensioner arm engaging said cable between said first and second ends thereof.

12. The vehicle seat assembly as set forth in claim 11 wherein said tensioner arm is biased towards said first pivotal position.

13. The vehicle seat assembly as set forth in claim 12 wherein said tensioner arm is in said second pivotal position when said seat back is in said upright seating position and when said seat back is in said spring engagement/disengagement position.

14. The vehicle seat assembly as set forth in claim 13 wherein said tensioner arm is in said first pivotal position when said seat back is in said folded position.

15. The vehicle seat assembly as set forth in claim 14 wherein said tensioner arm pivots from said second pivotal position to said first pivotal position in response to pivotal movement of said seat back from said spring engagement/disengagement position to said folded position, and wherein said tensioner arm pivots from said first pivotal position to said second pivotal position in response to pivotal movement of said seat back from said folded position to said spring engagement/disengagement position.

16. The vehicle seat assembly as set forth in claim 15 including a cable guide including a recliner cable guide mounted to said seat back and engaging said cable between said first and second ends to guide said cable in said circumferential direction around said pivot axis, wherein said recliner cable guide offsets said cable from said pivot axis generally in a direction which said seat back pivots towards said spring engagement/disengagement position thereby creating a moment about said pivot axis to assist with pivotal movement of said seat back from said upright seating position to said spring engagement/disengagement position in response to said biasing force of said recliner return mechanism.

17. The vehicle seat assembly as set forth in claim 4 including a cable tensioner mounted to said seat cushion and movable between a first position and a second position, said cable tensioner biased towards said first position and engaging said cable between said first and second ends thereof.

18. The vehicle seat assembly as set forth in claim 17 wherein said cable tensioner is in said second position when said seat back is in said upright seating position and when said seat back is in said spring engagement/disengagement position, and wherein said cable tensioner is in said first position when said seat back is in said folded position.

* * * * *